United States Patent [19]

Bezard et al.

[11] Patent Number: 4,745,739
[45] Date of Patent: May 24, 1988

[54] FUEL METERING DEVICE FOR A TURBOJET ENGINE

[75] Inventors: Jean-Yves L. N. Bezard, Vaux le Penil; Jean-Marie Brocard, Rubelles, both of France

[73] Assignee: Societe Nationale d'Etude et de Construction de Moteurs d'Aviation "S.N.E.C.M.A.", Paris, France

[21] Appl. No.: 819,625

[22] Filed: Jan. 17, 1986

[30] Foreign Application Priority Data

Jan. 24, 1985 [FR] France ................. 85 00951

[51] Int. Cl.$^4$ ............................................... F02C 9/26
[52] U.S. Cl. ........................... 60/39.281; 137/614.17; 251/285
[58] Field of Search ............... 60/39.281, 741; 137/614.17; 251/285

[56] References Cited

U.S. PATENT DOCUMENTS

| | | | |
|---|---|---|---|
| 2,536,158 | 1/1951 | Chamberlin et al. | 60/39.281 |
| 2,593,536 | 4/1952 | Chamberlin et al. | |
| 2,986,880 | 6/1961 | Fortmann | 60/39.281 |
| 2,989,849 | 6/1961 | Torell et al. | 60/39.281 |
| 3,203,176 | 8/1965 | Zeeks | 137/614.17 |
| 3,956,889 | 5/1976 | Smith | 60/39.281 |
| 4,404,637 | 9/1983 | Walters et al. | |

FOREIGN PATENT DOCUMENTS

| | | |
|---|---|---|
| 0105017 | 4/1984 | European Pat. Off. |
| 1291457 | 3/1962 | France |
| 1595739 | 7/1970 | France |
| 861530 | 2/1961 | United Kingdom |

Primary Examiner—Louis J. Casaregola
Attorney, Agent, or Firm—Bacon & Thomas

[57] ABSTRACT

The metering device of the present invention is characterized by controlling the simultaneous relative positions of two sliding valve elements so that the degree of opening between fuel inlet and outlet orifices always corresponds to the setpoint of the fuel flow. If the position of either of the two sliding elements in the metering device of the present invention can no longer be controlled for whatever reason, such as being jammed, the other element may always be controlled to move relative to the jammed element such that the fuel flow may be controlled by the other element to correspond to that of the fuel flow setpoint. Thus, the metering device according to the present invention will continue to operate effectively even if the position of either of its slide elements can no longer be properly controlled, either because the element has jammed or because there has been a malfunction in its control system.

23 Claims, 5 Drawing Sheets

FUEL METERING DEVICE FOR A TURBOJET ENGINE

FIELD OF THE INVENTION

The present invention relates to a fuel metering device, specifically such a device for a turbojet engine fuel system.

BRIEF DESCRIPTION OF THE PRIOR ART

In aircraft turbojet engine systems, it is of the utmost importance that fuel metering devices as well as their control elements be insensitive to any malfunction. This problem of achieving total operational reliability has been solved primarily by providing a redundant fuel metering device as well as redundant control components. This creates two separate control circuits for metering the fuel, each wholly independent of the other and each capable of operating alone in the event of a malfunction occurring in the other system. Typically, hydraulic switch means are provided to allow the switching between one circuit and the other. While redundant systems reliably solve the problem, they are also a very costly solution both in terms of manufacturing expense and in terms of occupying the rather limited space within the aircraft.

French Pat. No. 1,291,457 describes a control system for turbine engines in which a sleeve and a slide valve are telescopically mounted within a body such that they are capable of relative movement along the same axis between a closed position, wherein the slide valve completely blocks the fuel intake or outlet orifice in the sleeve, and an open position wherein the slide valve completely opens the orifice. The slide valve displacement is controlled by the output pressure from the turbojet engine compressor, while the sleeve displacement is controlled by a centrifugal regulator when the rotational speed of the turbojet engine exceeds a predetermined value. This metering device, which is not redundant, will be disabled the moment either the slide valve or the sleeve is jammed for any reason.

French Pat. No. 1,595,739 also describes a device for controlling the fuel supply to an engine. This device includes several sleeves telescopically mounted within each other to move along the same axis between relative positions so as to regulate the fuel flow, which enters the sleeves at orifices through their sidewalls, between a minimum value and a maximum value. Again, if for any reason one of the coaxial sleeves becomes jammed, the metering device is incapable of functioning in the normal manner.

SUMMARY OF THE INVENTION

It is an object of the present invention to provide a fuel metering device which is simpler than the known, redundant devices, but one which matches the reliability of such redundant devices.

The fuel metering device according to the present invention controls the fuel flow to a turbojet engine and comprises a housing having a sleeve valve and slide valve mounted therein such that they slide relative to each other (and to the housing) along a common axis. The relative position of the two elements may be varied between a closing position, wherein the slide valve completely closes off the fuel intake or outlet, and an open position wherein the slide valve allows unrestricted passage of the fuel from the intake to the outlet.

Means are provided in the present metering device to insure its operation even if the sliding elements and the various components associated with them should malfunction. The device achieves maximum operational reliability from a single metering device, thereby eliminating the need for a redundant system.

The metering device of the present invention is characterized by means controlling the simultaneous relative positions of the two sliding elements so that the degree of opening between the inlet and outlet orifices always corresponds to the setpoint of the fuel flow. If the position of either of the two sliding elements in the metering device of the present invention can no longer be controlled for whatever reason, such as being jammed, the other element may always be controlled to move relative to the jammed element such that the fuel flow may be controlled by the other element to correspond to that of the fuel flow setpoint. Thus, the metering device according to the present invention will continue to operate effectively even if the position of either of its slide elements can no longer be properly controlled, either because the element has jammed or because there has been a malfunction in its control system.

In a preferred embodiment of this invention, the two sliding elements are each mounted in separate bores defined by the fuel metering device housing. This effectively avoids the possibility that both slide elements will be simultaneously jammed so as to prevent any relative movement of one with respect to the other.

The position of each of the sliding elements may be controlled by directing pressurized fuel on either side of double acting pistons formed on each of the elements. The pressurized fuel may be controlled by servovalves which are, in turn, controlled by a computer system such that, in normal operation, a first slide element is kept in a central location between two fixed stops while the second slide element assumes a position corresponding to the setpoint of the fuel flow. The position may be determined by the computer, which controls the servovalves so as to position the second slide element between second stops, one of which defines the maximum flow position and the other defines the zero or minimum flow position. In this embodiment, the fluctuations in the fuel flow setpoint results only in the displacement of the second slide element while the first slide element remains effectively fixed near its central position.

Position sensors may be associated with the two slide elements to generate signals indicative of their positions with respect to the housing. The signals, whose difference or algebraic sum are proportional to the instantaneous output of the metering device, may be compared to the desired fuel flow setpoint emitted by the computer and the servovalves adjusted accordingly so as to maintain this desired fuel flow. Further means, such as a regulating valve, may be provided to maintain a constant difference in fuel pressure across the fuel intake and outlet of the metering device. These means, therefore, make it possible to maintain an instantaneous output of the metering device in regard to the desired setpoint fuel flow value, which is determined continuously by the computer from its various data inputs in relation to the operational conditions in the turbojet engine and the aircraft powered by it.

The total stroke of the first slide element on either side of its median position is selected to be twice the stroke of the second slide element. By choosing the dimensions of the total stroke of the first slide element, this element may be utilized to control the fuel flow should the second slide element be jammed against either of its two stops. In this event, further means may be provided in the present invention to automatically move the stops associated with the second slide element to a retracted position, thereby enabling the second element to be controllable so as to maintain the fuel flow at the desired setpoint. In order to make the second stops retractable, they may be mounted in a sliding manner within the housing so as to be displaceable along the same axis as the two sliding elements. The adjustable stops may also be controlled by pressurized fuel acting on double acting pistons attached to them. Again, the fuel to these double acting pistons may be controlled by a servovalve controlled by the computer. The stroke of each of the second stops between its normal and retracted positions is approximately equal to the normal stroke of the second slide element. This stroke is required to allow the second slide element to assume a position corresponding to the maximum or minimum flow value with respect to the first slide element when it is jammed against one of its stops.

In a first embodiment of the invention, the second sliding element may take the form of a slide valve which is slidingly mounted within the first sliding element, which may be a sleeve valve. The slide valve moves within the sleeve valve so as to open or close a fuel passage passing through the wall of the sleeve valve.

The first embodiment may include a plurality of fuel intake orifices and fuel outlet orifices distributed over the periphery of the sleeve wall near a common transverse plane and with axial symmetry. This arrangement is advantageous wherein the metering device is crossed by approximately two linear fuel jets going in opposite directions because the forces exerted by these jets on each movable element are substantially balanced. The arrangement of the orifices in a common transverse plane allows the metering device of the present invention to be more compact.

In another embodiment, two sets of intake and outlet chambers are present in the body so that the fuel intake and outlet orifices open this body regardless of the position of the sleeve valve. The intake and outlet chambers are connected and parallel, respectively, to a peripheral distributor and to a peripheral collector which are located in two transverse planes axially spaced apart. Again, this arrangement substantially balances the forces exerted on the sliding members by the fuel jets.

In another embodiment, the slide valve may comprise a tapered valve stem portion which interacts with the passage in the sleeve valve to form a needle valve structure. This arrangement is particularly advantageous wherein the relative motions of the slide valve and sleeve valve assure constant cleaning of the sleeve passage, thereby preventing its clogging due to impurities in the fuel.

DETAILED DESCRIPTION OF THE PREFERRED EMBODIMENTS

Figure 1:
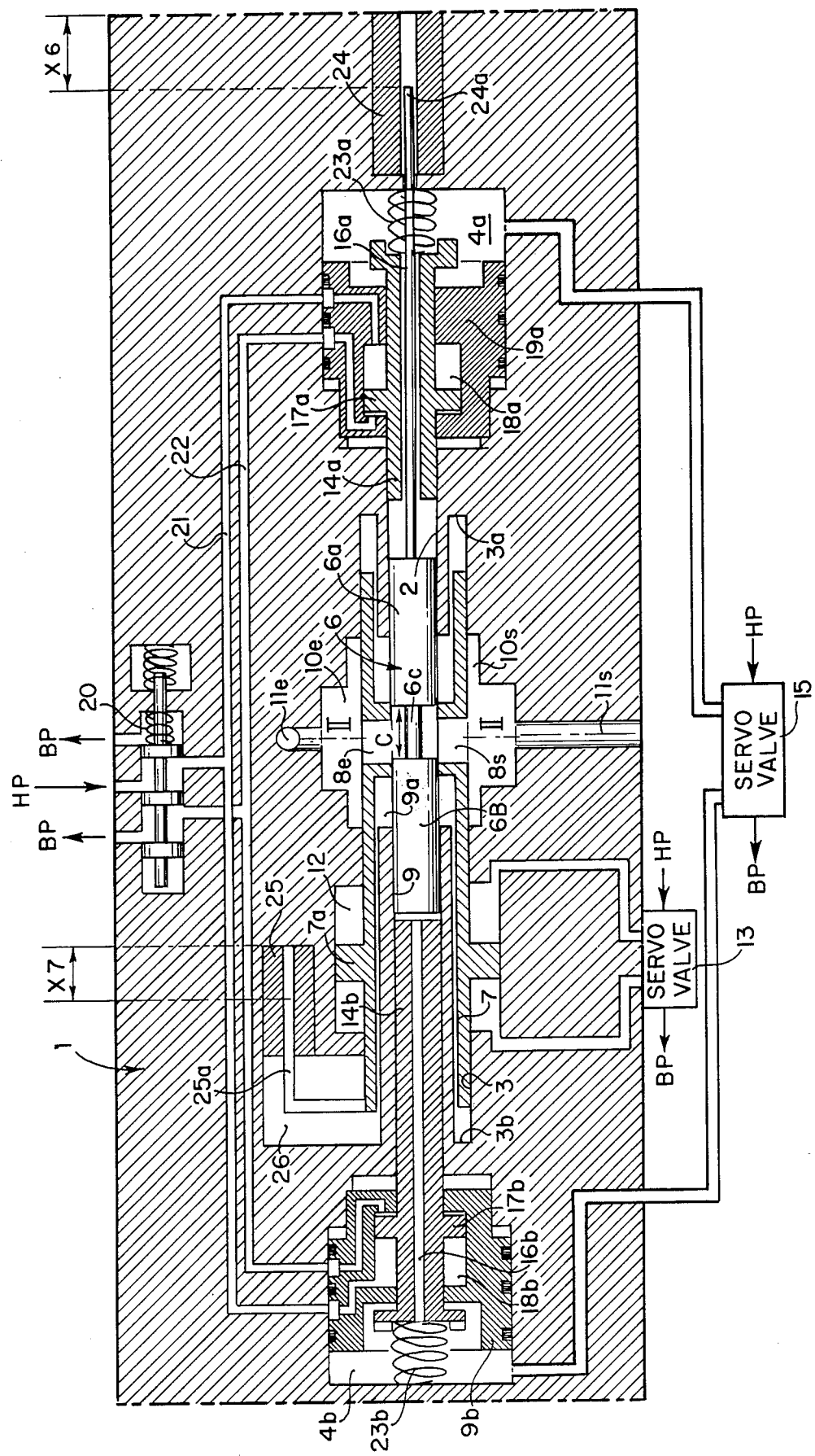
FIG. 1 is a longitudinal sectional view showing a first embodiment of the metering device according to the present invention.

FIG. 1 shows a first embodiment of the metering device according to the invention comprising a housing 1 defining two coaxial bores 2 and 3. The smaller diameter bore 2 extends between end chambers $4a$ and $4b$ in which slide valve 6 is slidably retained. Slide valve 6 consists of piston portions $6a$ and $6b$ interconnected by a reduced cross-section portion $6c$. Section $6c$ separates the faces of piston portions $6a$ and $6b$ by a distance c.

A sleeve valve 7 is slidably mounted in bore 3 such that the ends $3a$ and $3b$ of bore 3 constitute the fixed stops to limit the sliding movement of sleeve 7. Sleeve 7 defines two aligned holes $8e$ and $8s$ to form a passageway therethrough, each of the holes having a length in the axial direction of sleeve 7 approximately equal to c. The length of sleeve 7 is such that, when it is in its central position, shown in FIG. 1, each of its ends are spaced from the fixed stops $3a$ and $3b$ a distance of c.

The tubular wall 9, formed integrally with body 1 and separating the bores 2 and 3 defines a zone $9a$ whose axial dimension is at least equal to $3c$. Fuel intake and outlet chambers $10e$ and $10s$ are also defined by housing 1 and each are at least $3c$ long. The chambers communicate with bore 3 such that orifices $8e$ and $8s$ of the sleeve 7 are always in communication with chambers $10e$ and $10s$, respectively, regardless of the position of sleeve 7 within bore 3. The chamber $10e$ communicates via conduit $11e$ to the pressure side of the turbojet engine fuel pump (not shown), while fuel outlet chamber $10s$ communicates via outlet conduit $11s$ to the injectors (not shown) of the turbojet engine.

Sleeve 7 has double acting piston $7a$ attached thereto which is slidably received in chamber 12 defined by body 1. A known type of servovalve 13 allows high pressure fluid, for instance pressurized fuel, to be applied to either side of piston $7a$ so as to move sleeve 7 with respect to housing 1.

The displacement of slide valve 6 in bore 2 is limited by adjustable stops $14a$ and $14b$. Stops $14a$ and $14b$ are slidably mounted in bore 2 and are located on either side of the ends of slide valve 6. In its normal position as shown in FIG. 1, the left stop $14b$ contacts portion $6b$ of slide valve 6 so as to limit its motion toward the left as shown in FIG. 1. In this extreme position, the passages $8e$ and $8s$ of sleeve 7 are entirely open since the reduced dimension portion $6c$ of slide valve 6 is fully aligned with these passages. This defines the position of slide valve 6 in which the metering device passes the maximum amount of fuel.

As the position of slide valve 6 moves more toward the right (as viewed in FIG. 1) the large diameter portion $6b$ of slide valve 6 increasingly covers the intake orifice $8e$ and the outlet orifice $8s$ so as to reduce the flow of fuel through this passage. When portion $6a$ of slide valve 6 contacts adjustable stop $14a$, portion $6b$ completely seals the intake and outlet passages so that fuel flow discharging from conduit 11s is virtually shut off.

A second electric solenoid valve 15 controls the application of high pressure fluid, such as fuel, to either end of slide valve 6 so as to adjust its position relative to the housing 1. The pressurized fuel may be applied to either end chamber 4a or end chamber 4b. The fuel in these chambers passes through conduits 16a or 16b formed in the adjustable stops so as to communicate with the piston end faces of portions 6a or 6b of slide valve 6.

Adjustable stops 14a and 14b each have a double acting piston 17a and 17b attached thereto which slides within a cylindrical chamber 18a or 18b, respectively. As shown in FIG. 1, each of the chambers 18a and 18b is formed in a sleeve 19a or 19b which is fixedly mounted in chamber 4a or 4b, respectively.

The position of the adjustable stops 14a and 14b may be controlled by electrically actuated valve 20 which directs high pressure fluid, such as pressurized fuel, to opposite sides of pistons 17a and 17b. As shown in FIG. 1, valve 20 directs the pressurized fuel into conduit 21, defined within the housing 1, such that pressurized fuel is applied to the outer faces of pistons 17a and 17b. This serves to retain the adjustable stops 14a and 14b in their normal operating positions. This position is also maintained by return springs 23a and 23b acting between the housing and the adjustable stops 14a and 14b.

By changing the position of valve 20, pressurized fluid may be directed into conduit 22 which applies this pressurized fluid to the opposite faces of pistons 17a and 17b so as to force the adjustable stops 14a and 14b into their retracted positions.

The instantaneous positions of slide valve 6 and sleeve valve 7 are determined by position sensors 24 and 25, which may be inductive position sensors. Each of these position sensors comprises a cylindrical coil located in an axial bore formed in housing 1. Rod 24a which is formed of an electrically conducting material is attached to portion 6a of slide valve 6 such that it extends through adjustable stop 14a and into the opening of position sensor 24. The dimension of rod 24a is significantly smaller than the diameter of passage 16a such that the rod does not interfere with the passage of fluid pressure through the adjustable stop 14a.

Rod 25a is attached to sleeve valve 7 such that a portion of the rod enters position sensor 25. Rod 25a also serves to prevent rotation of sleeve valve 7 within the bore 3.

Figure 6:
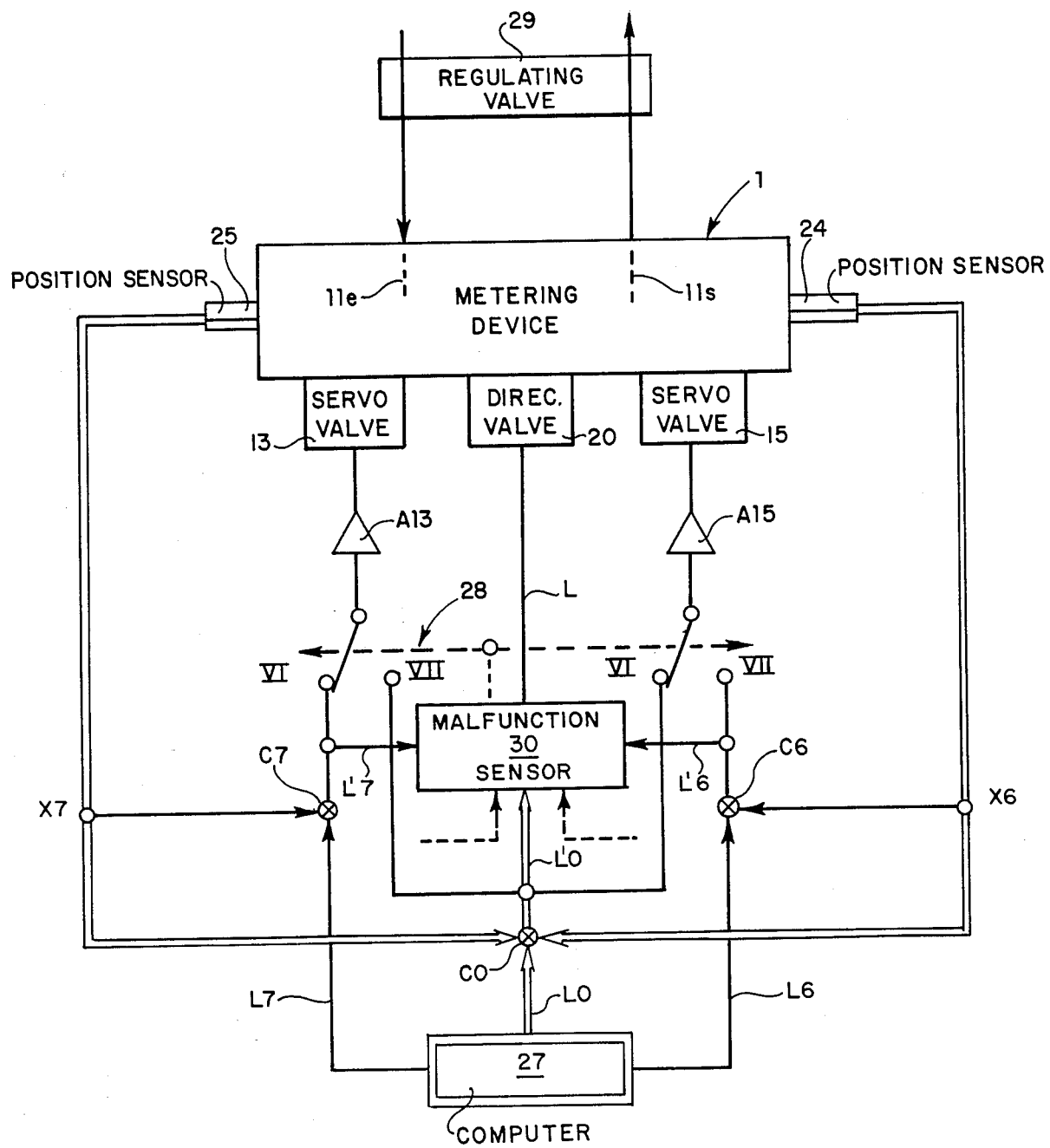
FIG. 6 is a schematic diagram of the control circuit for controlling the metering device according to the present invention.

FIG. 6 shows a schematic diagram of the control circuit utilized with the metering device shown in FIG. 1. Computer 27 receives by known means all of the data required to control the valves 13, 15 and 20 associated with the metering device 1. At output line L0, computer 27 provides a signal corresponding to the instantaneous setpoint value for the fuel flow, while on outputs L6 and L7 it emits setpoint signals, respectively, corresponding to the positioning of slide valve 6 against its stop 14a and keeping the sleeve valve 7 in its central position. Position sensors 24 and 25 provide signals proportional to the displacements X6 and X7 of the slide valve 6 and the sleeve valve 7, respectively, measured along their common axis from right to left as seen in FIG. 1. The displacements are selected such that the difference X6−X7 is proportional to the area of the orifices 8e and 8s of sleeve 7 which is cleared by the slide valve 6.

A regulating valve 29 is mounted between the fuel intake and outlet conduits 11e and 11s of the metering device 1 so as to maintain a constant fuel pressure drop through the device. Such pressure regulating valves are well known and the structure of this valve, per se, forms no part of the instant invention. Suffice it to say that any known regulating valve structure can be utilized in the system set forth in this invention.

The difference between the signals from sensors 25 and 24 is proportional to the instantaneous value of the fuel flow through the metering device. A comparator C0 implements this difference which is proportional to the fuel flow and compares it to the fuel flow setpoint value supplied by computer 27 through conductor L0.

Two other comparators C6 and C7 are mounted on conductors L6 and L7, and have their second inputs connected respectively to the sensors 24 and 25. Comparator C6 measures the deviation between the setpoint signal from the computer 27 which is required to move the slide valve 6 against its stop 14a and the signal representing the actual position X6 of slide valve 6. Comparator C7 measures the deviation between the setpoint signal from computer 27 which is required to maintain the sleeve 7 in its central position and the signal representing the actual position X7 of sleeve 7. 28 denotes a double-pole, double-throw switch having two positions VI and VII which are actuated in a manner described below.

When in the VI position corresponding to the normal operation shown in FIG. 6, switch 28 transmits the deviation signal from the comparator C0 to the input of servovalve 15 through amplifier A15, and the deviation signal from the comparator C7 to the input of servovalve 13 through amplifier A13. In this manner, servovalve 13 maintains sleeve 7 in its previously defined central position while servovalve 15 moves slide valve 6 toward the right or left (shown in FIG. 1) depending upon the deviation signal from the comparator C0 and over a distance proportional to its amplitude. This signal nulls when the slide valve 6 reaches its setpoint value.

30 denotes a malfunction sensor which receives data from comparators C0, C6 and C7 through conductors L'0, L'6 and L'7, respectively. This malfunction sensor may be a known device which, under given conditions, emits a control signal to move switch 28 from the position VI to the position VII and an inverting signal to electric valve 20 through conductor L.

If slide valve 6 were to jam or become otherwise immovable, the deviation signal from comparator C0 will appreciably deviate from zero for a predetermined amount of time. The malfunction sensor 30 senses this deviation and actuates switch 28 to move it into position VII. In that position, switch 28 transmits the deviation signal from the comparator C0 to the input of servovalve 13 through amplifier A13, and the deviation signal from the comparator C6 to the input of servovalve 15 through amplifier A15.

The pressurized fluid directed by servovalve 15 pushes the slide valve 6 toward its stop 14a while the servovalve 13 directs pressurized fluid against piston 7a so as to position sleeve 7 with respect to the slide valve 6 to null the deviation signal from the comparator C0, thereby assuring the required flow of fuel.

If sleeve 7 were to be jammed or otherwise rendered inoperative, the deviation signal from comparator C7 would deviate significantly from zero for a predetermined amount of time. The malfunction sensor 30 would sense this deviation and actuate electric valve 20 which would then direct pressurized fluid against pistons 17a and 17b so as to move adjustable stops 14a and 14b away from slide valve 6. Since slide valve 6 now has a longer stroke through which it may move, the entire available range of fuel flow metering is available even though sleeve 7 may be jammed, since slide valve 6 has the full range of movement available to it.

Figure 7:
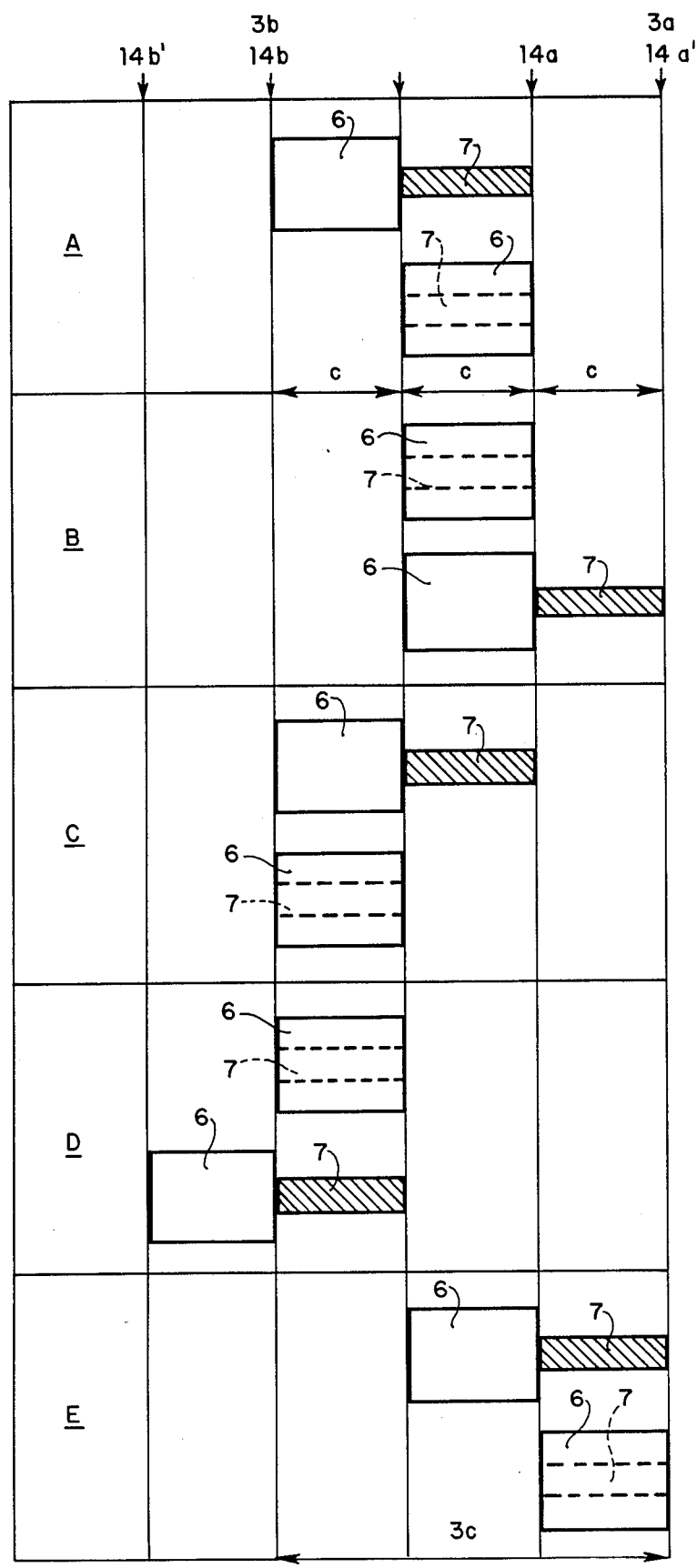
FIG. 7 is a schematic operational diagram showing the operation of the various elements in FIG. 1.

FIG. 7 shows a schematic operational diagram of the elements in FIG. 1. The position of slide valve 6 is denoted by the rectangle corresponding to side 6b of slide valve 6, while sleeve 7 is represented by the shaded rectangle corresponding to the intake orifice 8e of sleeve 7. For this operational diagram, it is assumed that the axial lengths of the elements representing the slide valve 6 and the sleeve 7 are both equal to c.

The box A in FIG. 7 corresponds to the normal operation of the metering device. It is assumed in the upper portion of this box A that slide valve 6 rests against its left stop 14b which, in turn, is assumed to be in its normal operating position. Thus, the orifice in sleeve 7 is entirely clear and passes the maximum amount of fuel. In the lower portion of box A, the slide valve 6 rests against its right stop 14a, also assumed to be in its normal operating position, such that the orifice of sleeve 7 is now completely blocked by the slide valve 6. This corresponds to the minimum fuel flow.

In box B of FIG. 7, slide valve 6 is assumed to be jammed against its stop 14a either due to the jamming of the valve itself or to a malfunction in the servovalve 15. As already described, switch 28 in FIG. 6 moves from position VI to position VII. In this instance, sleeve 7 is displaced by fluid supplied through servovalve 13 from the minimum flow location shown in the upper part of box B, to the maximum flow position shown in the lower part of box B, wherein sleeve 7 rests against its right stop 3a.

In box C of FIG. 7, slide valve 6 is assumed to be resting against its left stop 14b, which, again, is assumed to be in its normal position. Sleeve 7 may be displaced from the maximum flow position shown in the upper part of box C to the minimum flow position shown in the lower part, wherein sleeve 7 rests against its left stop 3b.

In box D of FIG. 7, sleeve 7 bears against its left stop 3b either because of a control malfunction or due to being jammed in that position. In this case, switch 28 returns to the VI position due to the action of malfunction sensor 30 which simultaneously commands the electric switch 20 to supply fluid against pistons 17a and 17b so as to move the stops 14a and 14b away from slide valve 6 into positions 14a' and 14b'. This allows slide valve 6 to move from the minimum flow position shown in the upper part of box D to the maximum flow position shown in its lower part.

Finally, in box E of FIG. 7, sleeve 7 rests against its right stop 3a and stops 14a and 14b are moved away from slide valve 6 to allow its maximum movement. This permits slide valve 6 to move from the maximum flow position shown in the upper part of box E to the minimum flow position shown in its lower part.

By doubling the position sensors 24 and 25 and also the computer 27, as indicated by double lines in FIG. 6, the metering assembly schematically shown in this Figure will operate reliably and constantly regardless of any malfunction affecting its various components, including electrical malfunction for the electrical components.

Figure 2:
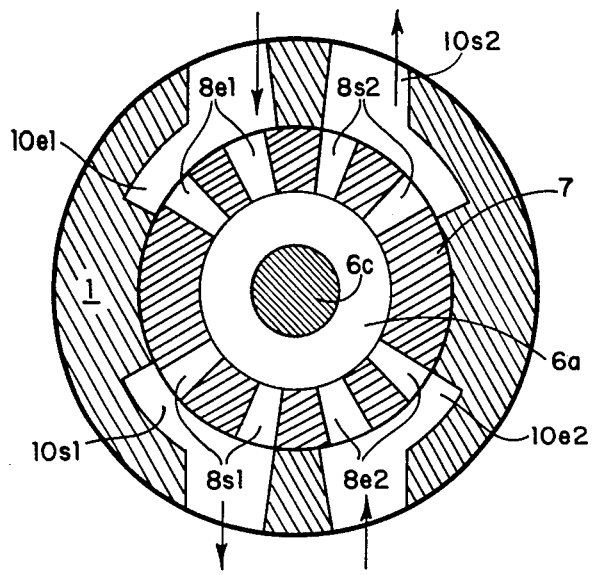
FIG. 2 is a cross-sectional view taken along line II—II in FIG. 1 showing a second embodiment of the invention.

A variation of the metering device is shown in cross-section in FIG. 2. This embodiment differs from the embodiment shown in FIG. 1 in that the wall of sleeve 7 defines two pairs of intake orifices 8e1 and 8e2 which are located diametrically opposite each other, and two diametrically opposite pairs of outlet orifices 8s1 and 8s2. The housing 1 further defines two intake chambers 10e1 and 10e2 located diametrically opposite each other, and two diametrically opposite outlet chambers 10s1 and 10s2. In this embodiment, regardless of the axial position of slide valve 6 and sleeve valve 7, the radial forces exerted thereon by the fuel will cancel each other because of axial symmetry. As a result, the displacement of slide valve 6 and sleeve valve 7 is easier, and there is less danger that either will become jammed in its respective bore. Also in this embodiment, all of the intake and outlet orifices of the sleeve 7 are located near the same transverse plane, thereby enabling the metering device to be more compact in an axial direction.

Figure 3:
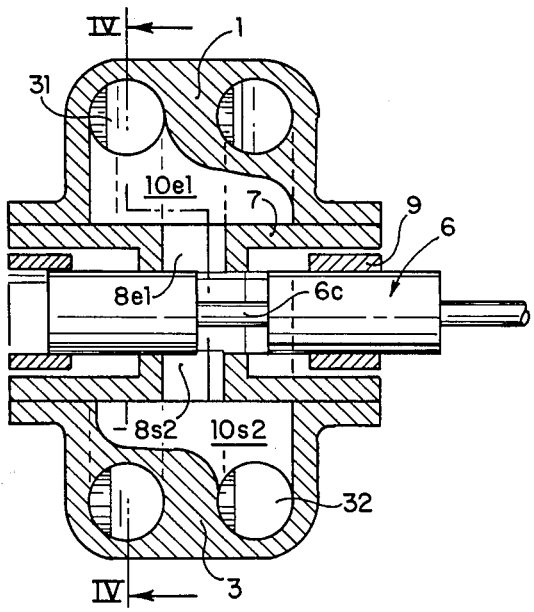
FIG. 3 is a partial, longitudinal sectional view showing a third embodiment of the device according to the invention.
Figure 4:
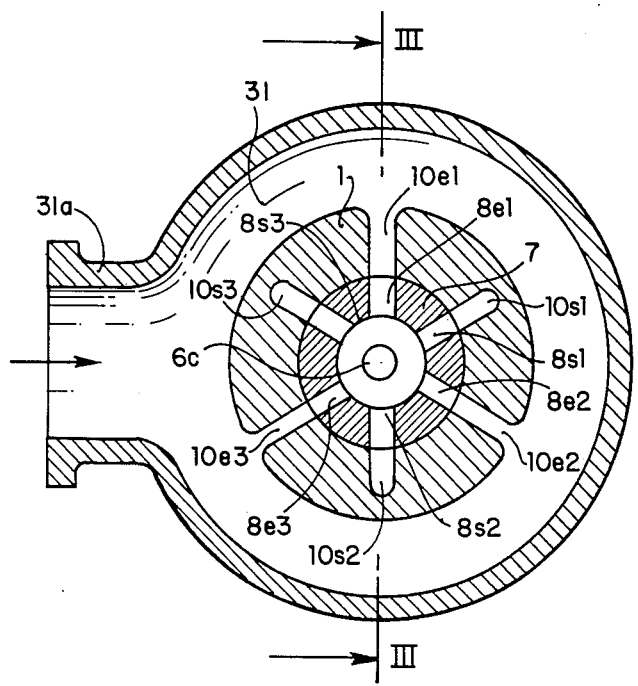
FIG. 4 is a sectional view taken along line IV—IV in FIG. 3.

In an alternative embodiment shown in FIGS. 3 and 4, the wall of sleeve 7 defines three intake orifices 8e1–8e3 and three outlet orifices 8s1–8s3 which are equidistantly distributed over the circumference of the sleeve. Sets of intake chambers 10e1–10e3 and output chambers 10s1–10s3 are defined by housing 1 such that intake orifices 8e1–8e3 and outlet orifices 8s1–8s3 open into the chambers regardless of the axial position of the sleeve valve 7. Intake chambers 8e1–8e3 communicate in parallel with peripheral distributor 31 communicating with opening 31a to receive pressurized fuel from the fuel pump. Similarly, outlet chambers 10s1–10s3 communicate in parallel with a peripheral collector 32 which distributes the metered fuel to the turbojet engine fuel injectors. Due to this symmetry, the inside of sleeve 7 is crossed by several fuel flows which exert forces with a substantially zero radial component on the slide valve.

Figure 5:
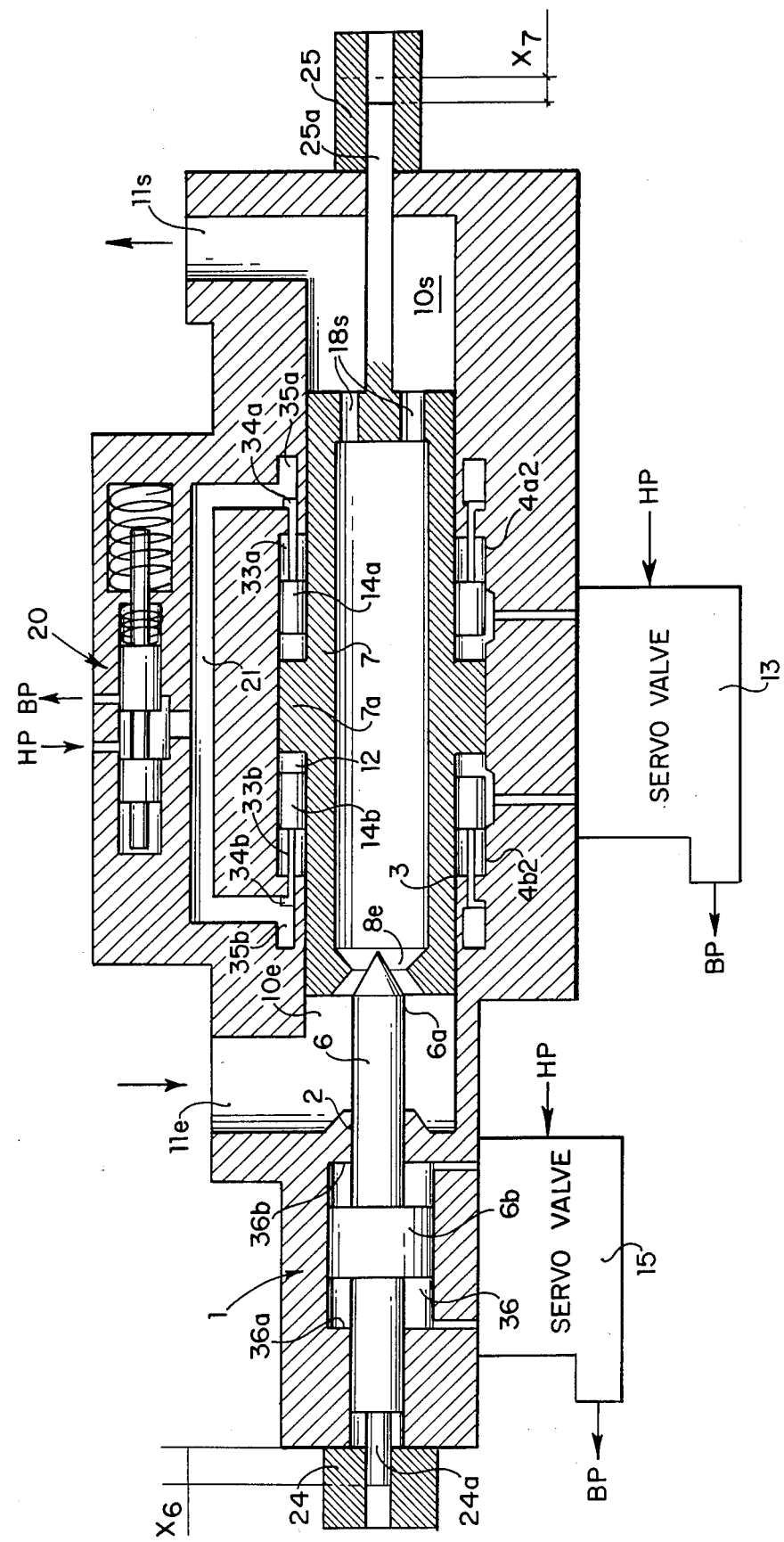
FIG. 5 is a longitudinal sectional view showing a fourth embodiment of the metering device according to the invention.

A fourth embodiment of the metering device is shown in FIG. 5. Components having the same function as components in FIG. 1 are illustrated by the same numbers. In this embodiment, sleeve valve 7 is slidably mounted within bore 3 defined by housing 1. The position of valve 7 is varied by the action of a pressurized fluid, such as fuel, bearing against piston 7a slidably mounted within chamber 12. Solenoid valve 13 controls the pressurized fluid as in the previous embodiment.

However, in this embodiment, the displacement of sleeve valve 7 is limited by movable stops 14a and 14b. The movable stops comprise annular rings which are slidably mounted within chamber 12 and located on either side of piston 7a. Rods 33a and 33b, respectively, connect rings 14a and 14b to stop means 34a and 34b which are movably mounted in chambers 35a and 35b defined by housing 1. Chambers 35a and 35b communicate with conduit 21 to receive high pressure or low pressure fuel, depending upon the position of electric valve 20. If chambers 35a and 35b receive pressurized fuel, the annular stops 14a and 14b are retained in their normal operating positions shown in FIG. 5. If low pressure fuel is supplied to these chambers, stops 14a and 14b may be forced back to the ends of chamber 12 into their retracted positions.

Sleeve valve 7 defines a single fuel intake orifice 8e located in its left end as viewed in FIG. 5. The pressurized fuel passes through intake conduit 11e, passes through sleeve 7, through outlet holes 8s and into outlet conduit 11s. The slide valve 6 comprises a tapered shaft portion 6a which enters the intake orifice 8e to act as a needle valve. A double acting piston 6b is attached to valve 6 and is slidably retained within chamber 36 defined by the housing 1. Chamber 36 receives either high pressure or low pressure fuel through solenoid valve 15 so as to move the valve 6 along its longitudinal axis. The longitudinal axis of valve 6 is coincident with that of sleeve valve 7.

The axial position of tapered portion 6a in the orifice 8e of sleeve 7 defines the cross-sectional area of the intake orifice 8e and, consequently, the instantaneous value of the metered fuel flow. The instantaneous axial positions of the valve 6 and the sleeve valve 7 are ascertained by position sensors 24 and 25, respectively, as in the previous embodiment.

In this embodiment, valve 6 is normally kept in a central position, as shown in FIG. 5 wherein the piston 6b is approximately centrally located within chamber 36 between fixed stops 36a and 36b, respectively. The instantaneous fuel flow value is varied by displacing sleeve 7 relative to the tapered portion 6a of valve 6 between the minimum flow value and the maximum value. In the various cases of malfunctions noted above, electric valve 20 may be actuated so as to move the annular stops 14a and 14b to their retracted positions, thereby tripling the range of motion of sleeve valve 7.

In the embodiments illustrated in FIGS. 2-4, the number of intake and outlet orifices in the sleeve valve 7, as well as that of the intake and outlet chambers in the body 1, is merely a matter of choice and more or less may be utilized without exceeding the scope of this invention. In lieu of being supplied with pressurized fuel, the valves 6 and 7, as well as the movable stops 14, may be actuated with a separate, pressurized fluid. Such positioning of these elements may also be accomplished by electrical means utilizing solenoids and mobile armatures of magnetic materials.

The foregoing is provided for illustrative purposes only and should not be construed as in any way limiting this invention, the scope of which is defined solely by the appended claims.

We claim:

1. A fuel metering device for a turbojet engine comprising:
   (a) a housing having a fuel inlet, a fuel outlet and defining chamber means interconnecting the fuel inlet and the fuel outlet;
   (b) a first valve means slidably supported by the housing so as to extend through the chamber means, the first valve means being movable along a first axis, the first valve means also defining a passage therethrough to allow fuel to flow from the fuel inlet to the fuel outlet;
   (c) a second valve means slidably supported by the housing so as to move along a second axis, the second valve means oriented so as to interact with the first valve means so as to meter the flow of fuel through the housing;
   (d) first actuating means to move the first valve means relative to the housing;
   (e) second actuating means to move the second valve means relative to the housing;
   (f) adjustable stop means acting on one of the first and second valve means to limit its axial movement during normal operating conditions; and,
   (g) third actuating means connected to the adjustable stop means so as to reposition the stop means to retracted positions should one of the valve means become immovable such that the remaining movable valve means may continue to meter the flow of fuel at the desired value.

2. The fuel metering device according to claim 1 wherein the housing defines a first and second bores, and wherein the first valve means is slidably mounted in the first bore, and the second valve means is slidably mounted in the second bore.

3. The fuel metering device according to claim 2 wherein the first valve means is a sleeve valve.

4. The fuel metering device according to claim 3 wherein the second valve means is a slide valve.

5. The fuel metering device according to claim 4 wherein the sleeve valve further comprises a first double acting piston and wherein the first actuating means comprises first supply means to selectively supply pressurized fuel to the first piston so as to move the sleeve valve relative to the housing.

6. The fuel metering device according to claim 5 wherein the slide valve further defines second double acting piston means, and wherein the second actuating means comprises second supply means to selectively supply pressurized fuel to the second double acting piston means so as to move the slide valve with respect to the housing.

7. The fuel metering device according to claim 6 further comprising fixed stop means acting on either side of the valve means which is not acted on by the adjustable stop means.

8. The fuel metering device according to claim 7 wherein the adjustable stop means comprises first and second stops located on either side of the one valve means.

9. The fuel metering device according to claim 8 further comprising control means interconnected to the first, second and third actuating means so as to position the valve means acted on by the fixed stops approximately intermediate the fixed stops, and to vary the position of the other valve means between one adjustable stop defining a minimum fuel flow and the other adjustable stop which defines a maximum fuel flow position.

10. The fuel metering device according to claim 9 wherein the control means comprises:
   (a) a first servovalve connected to the first supply means;
   (b) a second servovalve connected to the second supply means; and,
   (c) computer control means connected to the first and second servovalves.

11. The fuel metering device according to claim 10 further comprising:
   (a) first position sensing means to provide a first output signal indicative of the position of the first valve means relative to the housing;
   (b) second position sensing means to provide a second output signal indicative of the position of the second valve means relative to the housing; and,
   (c) means to transmit the first and second output signals to the computer control means to provide an instantaneous indication of the relative positions of the first and second valve means, and, consequently, the metering of the fuel flow through the housing.

12. The fuel metering device according to claim 11 further comprising comparator means associated with the computer control means so as to compare the fuel flow passing through the housing with a predetermined setpoint value.

13. The fuel metering device according to claim 12 wherein the distance moved by the valve means not acted on by the adjustable stops is approximately twice the distance moved by the valve means acted on by the adjustable stops when the adjustable stops are in their limiting positions.

14. The fuel metering device according to claim 13 wherein the first and second axes are coaxial.

15. The fuel metering device according to claim 14 wherein the first and second stops are coaxial with the axes of the first and second valve means.

16. The fuel metering device according to claim 15 further comprising third and fourth piston means on the first and second stops, respectively, and wherein the third actuating means comprises third supply means to selectively supply pressurized fuel to the third and fourth piston means so as to move the first and second stops between their normal and retracted positions.

17. The fuel metering device according to claim 16 wherein the distance between the normal and retracted positions of each stop is approximately equal to the distance moved by the valve means acted on by the adjustable stop means.

18. The fuel metering device according to claim 15 wherein the sleeve valve is concentrically located about the slide valve.

19. The fuel metering device according to claim 18 wherein the housing defines two fuel inlet orifices and two fuel outlet orifices arranged symmetrically with respect to the first and second axes so as to balance the forces exerted on the sleeve valve and slide valve by the fuel.

20. The fuel metering device according to claim 19 wherein the housing defines a peripheral fuel inlet distributor interconnecting the two fuel inlet orifices and a peripheral fuel outlet collector interconnecting the two fuel outlet orifices.

21. The fuel metering device according to claim 4 wherein the adjustable stop means acts on the slide valve.

22. The fuel metering device according to claim 4 wherein the adjustable stop means acts on the sleeve valve.

23. The fuel metering device according to claim 22 wherein the slide valve has a tapered valve stem portion which passes into the passage defined by the sleeve valve.

* * * * *

UNITED STATES PATENT AND TRADEMARK OFFICE
CERTIFICATE OF CORRECTION

PATENT NO.  : 4,745,739
DATED       : May 24, 1988
INVENTOR(S) : BEZARD ET AL

It is certified that error appears in the above-identified patent and that said Letters Patent is hereby corrected as shown below:

In claim 12, column 10, line 66, delete "value" and insert --valve--.

Signed and Sealed this

Fifteenth Day of November, 1988

Attest:

DONALD J. QUIGG

*Attesting Officer*        Commissioner of Patents and Trademarks